United States Patent
Shimura et al.

(10) Patent No.: US 12,148,936 B2
(45) Date of Patent: Nov. 19, 2024

(54) METHOD FOR MANUFACTURING ANGULAR BATTERY, AND ANGULAR BATTERY

(71) Applicant: PRIME PLANET ENERGY & SOLUTIONS, INC., Tokyo (JP)

(72) Inventors: Yosuke Shimura, Nagoya (JP); Hideki Asadachi, Toyota (JP); Minehiro Funato, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 17/386,991

(22) Filed: Jul. 28, 2021

(65) Prior Publication Data

US 2022/0052401 A1 Feb. 17, 2022

(30) Foreign Application Priority Data

Aug. 12, 2020 (JP) .................................. 2020-136274

(51) Int. Cl.
  *H01M 50/103* (2021.01)
  *H01M 50/102* (2021.01)
(52) U.S. Cl.
  CPC ....... *H01M 50/103* (2021.01); *H01M 50/102* (2021.01)
(58) Field of Classification Search
  None
  See application file for complete search history.

(56) References Cited

U.S. PATENT DOCUMENTS

2011/0117426 A1 5/2011 Choi et al.
2013/0108909 A1 5/2013 Matsuo et al.
(Continued)

FOREIGN PATENT DOCUMENTS

CN 102064334 A 5/2011
CN 102934259 A 3/2015
(Continued)

*Primary Examiner* — Jonathan G Leong
*Assistant Examiner* — Tony S Chuo
(74) *Attorney, Agent, or Firm* — Finnegan, Henderson, Farabow, Garrett and Dunner, LLP

(57) ABSTRACT

The present disclosure provides a method for manufacturing an angular battery having improved insertability of an electrode body. According to the present disclosure, there is provided a method for manufacturing an angular battery including a battery case that has a rectangular bottom surface and a pair of long side surfaces having, as one side thereof, a long side of the rectangular bottom surface and facing each other, and an electrode body that is accommodated in the battery case and wide surfaces facing the long side surfaces. The manufacturing method includes a preparation step of preparing a first member having substantially U-shaped end faces including the bottom surface and the pair of long side surfaces extending from the bottom surface, and a second member and a third member that are to be joined to respective end faces of the first member and constitute short side surfaces; a sandwiching step of sandwiching the wide surfaces of the battery body between the pair of long side surfaces of the first member; and a joining step of joining the second and third members to the respective end faces of the first member in a state in which the electrode body is sandwiched by the pair of long side surfaces.

4 Claims, 3 Drawing Sheets

(56) References Cited

U.S. PATENT DOCUMENTS

| | | | |
|---|---|---|---|
| 2016/0204399 A1* | 7/2016 | Suzuki | H01M 50/103 |
| | | | 429/152 |
| 2017/0237045 A1 | 8/2017 | Kim et al. | |
| 2019/0097206 A1 | 3/2019 | Ishihama et al. | |
| 2019/0252731 A1 | 8/2019 | Yamane | |
| 2022/0231356 A1* | 7/2022 | Sugiyo | H01M 50/148 |

FOREIGN PATENT DOCUMENTS

| | | |
|---|---|---|
| JP | 06-150974 A | 5/1994 |
| JP | 10-021890 A | 1/1998 |
| JP | H 1012278 A | 1/1998 |
| JP | 2002-198011 A | 7/2002 |
| JP | 2002-216709 A | 8/2002 |
| JP | 2004-103368 A | 4/2004 |
| JP | 2008-234868 A | 10/2008 |
| JP | 2011-108612 A | 6/2011 |
| JP | 2012-028365 A | 2/2012 |
| JP | 2013-118152 A | 6/2013 |
| JP | 2013-222630 A | 10/2013 |
| JP | 2014-011052 A | 1/2014 |
| JP | 2016-062645 A | 4/2016 |
| JP | 2017-107773 A | 6/2017 |
| JP | 2017-532715 A | 11/2017 |
| JP | 2019-139955 A | 8/2019 |
| KR | 2007-0025687 A | 3/2007 |
| KR | 10-1132146 B1 | 4/2012 |
| KR | 10-2013-0018312 A | 2/2013 |
| WO | WO 2011/155559 A1 | 12/2011 |
| WO | WO 2020241781 A1 * 12/2020 ............ H01M 10/04 |  |

\* cited by examiner

METHOD FOR MANUFACTURING ANGULAR BATTERY, AND ANGULAR BATTERY

BACKGROUND OF THE INVENTION

1. Field of the Invention

The present disclosure relates to a method for manufacturing an angular battery, and an angular battery. The present application claims priority based on Japanese Patent Application No. 2020-136274 filed on Aug. 12, 2020, and the entire contents of the patent application are incorporated herein by reference.

2. Description of the Related Art

Generally, a battery such as a lithium-ion secondary battery includes an electrode body and a battery case that accommodates the electrode body. As one form of such a battery, an angular battery using an angular (box-like) battery case is known. For example, in applications such as a high-output power source for driving a vehicle, a battery pack in which a plurality of angular batteries are arranged in a predetermined direction and restrained by a restraining jig is widely used. Japanese Patent Application Publication No. 2017-107773, Japanese Patent Application Publication No. H6-150974, Japanese Patent Application Publication No. 2004-103368, Japanese Patent Application Publication No. H10-21890, and Japanese Patent Application Publication No. 2002-198011 can be exemplified as related art documents relating to angular batteries.

For example, in Japanese Patent Application Publication No. 2017-107773, an angular battery is manufactured by bending one flat plate into a U-shaped cross section to produce a first member, thereafter welding a second member and a third member (flat plates) to respective end faces of the first member to produce a battery case having an angular opening with fixed four corners, then accommodating an electrode body inside of the battery case through the opening, and thereafter closing the opening with a sealing plate.

SUMMARY OF THE INVENTION

From the viewpoint of improving a volumetric energy density, an electrode body is formed in a largest possible size within the range in which the electrode body can be inserted through the opening of a battery case. Therefore, where an attempt is made to insert the electrode body through the angular-shaped opening after producing the battery case, the outer peripheral portion of the electrode body may be caught in the opening and it may be difficult to insert the electrode body.

The present disclosure has been created in view of the above circumstances and provides a method for manufacturing an angular battery having improved insertability of an electrode body, and the angular battery.

According to the present disclosure, there is provided a method for manufacturing an angular battery including a battery case that has a rectangular bottom surface, a pair of long side surfaces having, as one side thereof, a long side of the rectangular bottom surface and facing each other, and a pair of short side surfaces having, as one side thereof, a short side of the rectangular bottom surface and facing each other; and an electrode body that is accommodated inside the battery case and has a pair of wide surfaces facing the long side surfaces. The manufacturing method includes: a preparation step of preparing a first member having substantially U-shaped end faces including the bottom surface and the pair of long side surfaces extending from the bottom surface, and a second member and a third member that are to be joined to respective end faces of the first member and constitute the short side surfaces, the members constituting the battery case; a sandwiching step of sandwiching the wide surfaces of the battery body between the pair of long side surfaces of the first member; and a joining step of joining the second and third members to the respective end faces of the first member in a state in which the electrode body is sandwiched by the pair of long side surfaces.

In the abovementioned manufacturing method, by contrast with the conventional method, the electrode body is first put in the first member having substantially U-shaped end faces, and in that state, the second and third members are joined to the first member. As a result, the insertability of the electrode body can be improved as compared with the conventional method of inserting the electrode body through the angular opening after the battery case has been produced, and a state in which the electrode body is accommodated in the battery case can be efficiently realized. Further, in the abovementioned manufacturing method, it is not necessary to ensure a clearance between the battery case and the electrode body. Therefore, it is possible to increase the size of the electrode body as compared with the conventional method. In addition, in the abovementioned manufacturing method, the construction of the battery case and the accommodation of the electrode body in the battery case are performed at the same time. Therefore, the yield of the battery case itself can be improved and the manufacturing cost can be reduced.

As a related art relating to the insertability of an electrode body, for example, Japanese Patent Application Publication No. H6-150974 indicates that where an electrode body wrapped with an electrically conductive cover (a formed product of a copper sheet) is inserted through an opening, the electrically conductive cover can play the role of an insertion guide, thereby improving the insertability into the battery case.

In a desired embodiment of the manufacturing method disclosed herein, in the sandwiching step, the pair of long side surfaces of the first member sandwich the wide surfaces of the electrode body with a sandwiching force of 15 N or more. As a result, for example, even if a light impact or the like is applied to the battery case in the joining step, it becomes easy to stably maintain the state in which the electrode body is accommodated in the battery case.

In a desired embodiment of the manufacturing method disclosed herein, at least portions of the wide surfaces of the electrode body that are to be sandwiched between the pair of long side surfaces are covered with an insulating film, and the electrode body is sandwiched together with the insulating film between the pair of long side surfaces of the first member in the sandwiching step. As a result, the electrode body can be smoothly accommodated together with the insulating film in the battery case without generating wrinkles in the insulating film.

In a desired embodiment of the manufacturing method disclosed herein, in the preparation step, prepared are the first member, in which the pair of long side surfaces are provided to be inclined so that a distance therebetween becomes smaller as a distance from the bottom surface increases, and the second and third members each having a trapezoidal shape. As a result, the upper part of the electrode body can be firmly sandwiched between the pair of long side surfaces, and the state in which the electrode body is accommodated in the battery case can be maintained more stably.

The angular battery disclosed herein includes a battery case that has a rectangular bottom surface, a pair of long side surfaces having, as one side thereof, a long side of the rectangular bottom surface and facing each other, and a pair of short side surfaces having, as one side thereof, a short side of the rectangular bottom surface and facing each other; and an electrode body that is accommodated inside the battery case and has a pair of wide surfaces facing the long side surfaces. The pair of long side surfaces of the battery case sandwich the wide surfaces of the electrode body. In the above configuration, tension (sandwiching force) is applied to the electrode body without using separately a restraint jig for restraining the battery. As a result, the electrode body is less likely to shift in the battery case, and expansion and contraction of the electrode body can be suppressed, so that stable charging and discharging can be advantageously realized.

In a desired embodiment of the angular battery disclosed herein, the pair of long side surfaces of the battery case sandwich the wide surfaces of the electrode body with a sandwiching force of 15 N or more. As a result, for example, even if a light impact or the like is applied to the battery case, it becomes easy to stably maintain the electrode body at a predetermined position.

In a desired embodiment of the angular battery disclosed herein, the pair of long side surfaces are provided to be inclined so that a distance therebetween becomes smaller as a distance from the bottom surface increases, and the short side surfaces each have a trapezoidal shape. As a result, the upper part of the electrode body can be firmly sandwiched between the long side surfaces, and the state in which the sandwiching force is applied to the electrode body can be stably maintained.

DESCRIPTION OF THE PREFERRED EMBODIMENTS

Hereinafter, desired embodiments of the techniques disclosed herein will be described with reference to the drawings. Matters other than those specifically mentioned in the present specification, but necessary for implementing the present disclosure (for example, general configuration and manufacturing process of the battery that do not characterize the present disclosure) can be ascertained as a design matter to be addressed by a person skilled in the art on the basis of the related art. The present disclosure can be implemented based on the contents disclosed in the present description and the common technical knowledge in the pertinent field.

In the present description, the term "battery" refers to all general power storage devices capable of releasing electrical energy, and thus is a concept inclusive of a primary battery and a secondary battery. Further, in the present description, the term "secondary battery" refers to all general power storage devices capable of repeatedly charging and discharging, and thus is a concept inclusive of a so-called storage battery (chemical battery) such as a lithium-ion secondary battery and a nickel hydrogen battery, and a capacitor (physical battery) such as an electric double-layer capacitor.

Figure 1:
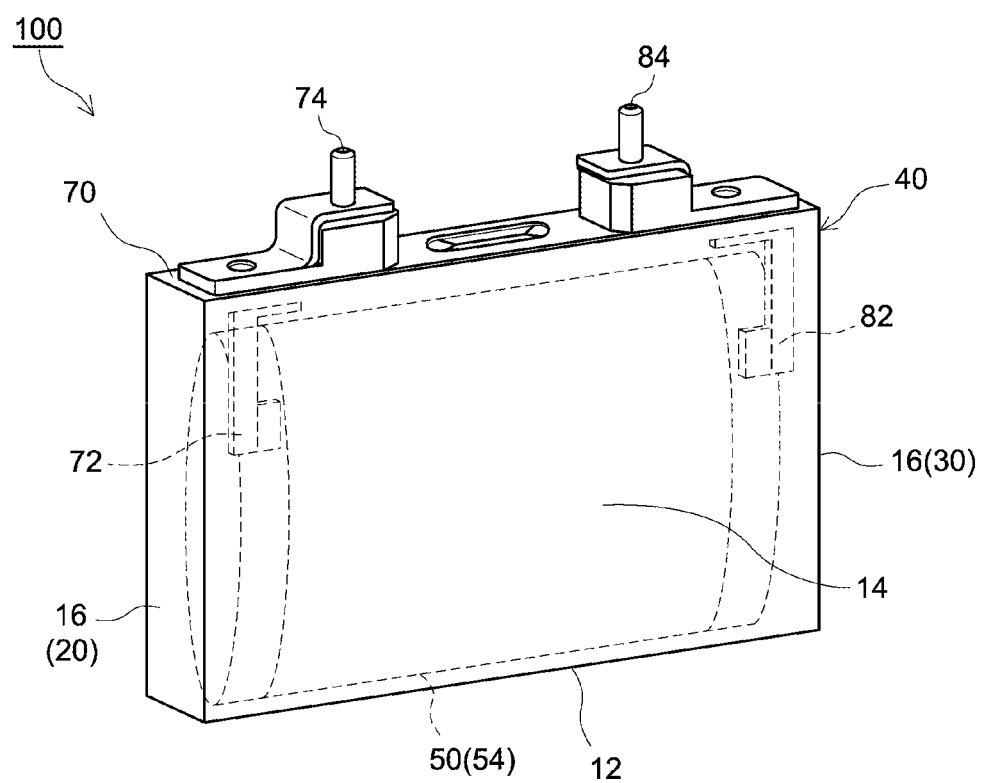
FIG. 1 is a schematic perspective view of an angular battery according to an embodiment.
Figure 2:
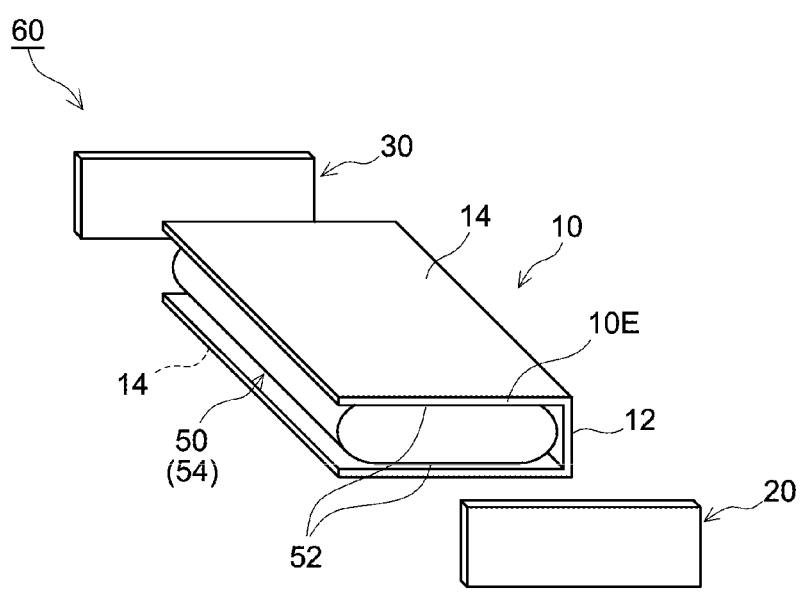
FIG. 2 is a schematic exploded perspective view of a unit body according to an embodiment.

FIG. 1 is a schematic perspective view of an angular battery 100. A method for manufacturing the angular battery 100 disclosed herein includes a preparation step, a sandwiching step, a joining step, and a sealing step. The sealing step is not essential and may be omitted in other embodiments. In addition, the manufacturing method of the present embodiment may include, as appropriate, steps other than the above at any stage. The preparation step, the sandwiching step, and the joining step are steps of constructing a unit body 60 (see FIG. 2), which will be described hereinbelow. FIG. 2 is a schematic exploded perspective view of the unit body 60. Each step will be described hereinbelow.

In the preparation step, the members constituting a battery case 40 (see FIG. 1) are prepared. Specifically, as shown in FIG. 2, a first member 10, a second member 20, and a third member 30 are prepared. The first to third members 10, 20, and 30 are typically made of a metal such as aluminum, an aluminum alloy, or stainless steel. The first to third members 10, 20, and 30 may be the same as those described in, for example, Japanese Patent Application Publication No. 2017-107773.

The first member 10 includes a rectangular (rectangularly shaped) bottom surface 12 and a pair of long side surfaces 14 extending from the bottom surface 12. The long side surface 14 is a side surface having as one side thereof a long side of the rectangular bottom surface 12. In the present description, the term "rectangular" encompasses, for example, a shape in which a straight long side and a straight short side are joined to each other via a curve, a shape in which at least one of a long side and a short side is curved, convex or concave, and bent, rather than being straight, and which is thereby configured of a plurality of straight lines or curves, and the like.

As shown in FIG. 2, the surface of the first member 10 facing the bottom surface 12 is opened (open). The first member 10 is configured to have a size and shape capable of accommodating inside thereof an electrode body 50 described hereinbelow, that is, in the space surrounded by the bottom surface 12 and the pair of long side surfaces 14. The pair of long side surfaces 14 here have the same shape and size. The pair of long side surfaces 14 may have elasticity (springiness) from the viewpoint of improving the insertability and sandwiching property of the electrode body 50 described hereinbelow. The first member 10 can be prepared by, for example, bending a single flat plate having an angular shape (typically a rectangular shape) into a substantially U-like shape according to the dimensions of the battery case 40 to form the bottom surface 12 and the long side surfaces 14. In FIG. 2, one flat plate is bent so that the pair of long side surfaces 14 rise vertically from the bottom surface 12. Here, the angle formed by the bottom surface 12 and each of the pair of long side surfaces 14 is 90°.

Each of end faces 10E is formed at both ends of the first member 10 in the longitudinal direction. The end faces 10E of the first member 10 have a substantially U-shape. In the present description, the term "substantially U-shaped" generally means all shapes in which three of the four sides are closed by the bottom surface 12 and the long side surfaces 14 and one side is open, for example, as in a rectangular shape without one side or a U-like shape. Therefore, the angle formed by the bottom surface 12 and the long side surface 14 does not have to be a right angle, and may be, for example, an acute angle (less than 90°).

The second and third members 20 and 30 are to be joined to respective end faces 10E of the first member 10. As shown in FIG. 2, the second and third members 20 and 30 are here angular (typically rectangular) flat plate members. Here, the second and third members 20, 30 have the same shape and size.

In the sandwiching process, first, the electrode body 50 is prepared. The electrode body 50 may be the same as the conventional one, and is not particularly limited. Although not shown, the electrode body 50 has a positive electrode and a negative electrode. Here, the electrode body 50 is a flat wound electrode body formed by winding a band-shaped positive electrode and a band-shaped negative electrode in an insulated state. However, the electrode body 50 may also be a stacked-type electrode body in which angular (typically rectangular) positive electrode sheets and angular (typically rectangular) negative electrode sheets are laminated in an insulated state. As shown in FIG. 2, the electrode body 50 has a pair of wide surfaces 52. Here, the wide surface 52 has a substantially rectangular shape in a plan view. Here, the entire electrode body 50 is covered with an insulating film 54. However, the electrode body 50 may be partially covered with the insulating film 54 and a part of the electrode body 50 may be exposed.

The material and shape of the insulating film 54 may be the same as the conventional ones, and are not particularly limited. The material of the insulating film 54 may be, for example, a resin material such as polypropylene (PP) or polyethylene (PE). The shape of the insulating film 54 may be, for example, a bottomed bag shape having one side opened so as to accommodate the electrode body 50, a tubular shape, or a sheet shape. Here, the entire wide surface 52 of the electrode body 50 is covered with the insulating film 54. However, of the wide surface 52, only a part including at least a portion to be sandwiched by a pair of long side surfaces 14 may be covered with the insulating film 54.

In this step, next, as shown in FIG. 2, the electrode body 50 is inserted into the inside of the first member 10, that is, the space surrounded by the bottom surface 12 and the pair of long side surfaces 14. The electrode body 50 may be inserted, for example, from the side of the end face 10E of the first member 10, or for example, when the pair of long side surfaces 14 have elasticity, the opening facing the bottom surface 12 may be expanded from the inside and the electrode body may be inserted through the opening. The entire electrode body 50 is typically accommodated inside the first member 10. The wide surfaces 52 of the electrode body 50 are entirely or partially sandwiched between the pair of long side surfaces 14 of the first member 10. When the periphery of the electrode body 50 is covered with the insulating film 54, the wide surfaces 52 may be sandwiched by a pair of long side surfaces 14 together with the insulating film 54. As a result, the electrode body 50 is sandwiched by the first member 10, and the first member 10 and the electrode body 50 are integrated.

As a result of sandwiching the electrode body 50 between the pair of long side surfaces 14 in this way, a sandwiching force is applied to the wide surfaces 52 by the pair of long side surfaces 14 of the first member 10 without separately using a restraint jig. Although not particularly limited, the sandwiching force applied to the wide surfaces 52 of the electrode body 50 is generally 1 N or more, typically 5 N or more, desirably 10 N or more, and for example, 15 N or more. In the conventional method of inserting the electrode body through the angular opening after producing the battery case, the electrode body is not sandwiched by the battery case and the sandwiching force is substantially 0 N because there is a clearance between the battery case and the electrode body. The sandwiching force applied to the wide surfaces 52 of the electrode body 50 is typically smaller than the pressure applied to the electrode body by using a restraint jig when producing a battery pack, and is approximately 60 N or less, and may be, for example, 50 N or less, 40 N or less, and 30 N or less. The sandwiching force applied to the wide surfaces 52 of the electrode body 50 by the pair of long side surfaces 14 can be measured by sandwiching a load cell between the pair of long side surfaces 14.

In the joining step, the second and third members 20 and 30 are joined to the first member 10 integrated with the electrode body 50. Specifically, first, as shown in FIG. 2, the second and third members 20 and 30 are arranged on the respective end faces 10E of the first member 10. Then, the second and third members 20 and 30 are joined to the first member 10. The method of joining the first member 10 and the second and third members 20 and 30 may be the same as in the related art, and is not particularly limited. The joining can be performed by, for example, laser welding. The unit body 60 including the first to third members 10, 20, and 30 and the electrode body 50 can be constructed in the above-described manner. The unit body 60 has a bottomed rectangular parallelepiped shape in which a surface facing the bottom surface 12 is opened.

In the sealing step, first, a sealing plate 70 (see FIG. 1) that is to close the opening of the unit body 60 is prepared. The sealing plate 70 may be the same as the conventional one, and is not particularly limited. In this step, the opening of the unit body 60 is then sealed with the sealing plate 70. The method of sealing the opening may be the same as the conventional method, and is not particularly limited. The opening can be sealed by, for example, laser welding. Typically, after sealing the unit body 60, an electrolyte is injected (typically, a non-aqueous electrolytic solution is injected) through a liquid injection hole (not shown) provided in the sealing plate 70 or the like. The angular battery 100 (see FIG. 1) can be manufactured in the above-described manner.

As described above, in the manufacturing method of the present embodiment, the electrode body 50 is sandwiched at the stage of the first member 10 before the side surfaces of the battery case 40 are completely closed, the first member 10 and the electrode body 50 are integrated, and then the second and third members 20 and 30 are joined to the first member 10. Therefore, the insertability of the electrode body 50 can be improved as compared with the conventional method of forcibly inserting the electrode body through the angular opening after the side surfaces of the battery case have been closed, and a state in which the electrode body 50 is accommodated in the battery case 40 (that is, the state of the unit body 60) can be efficiently realized. Further, in the manufacturing method of the present embodiment, since the electrode body 50 is sandwiched by the first member 10, the angular battery 100 (see FIG. 1) can be manufactured while stably maintaining the state in which the electrode body 50 is accommodated in the battery case 40 even if a light impact or the like is applied to the unit body 60 in, for example, the joining process.

Furthermore, in the above manufacturing method, it is not necessary to ensure a clearance between the battery case and the electrode body. Therefore, as compared with the conventional method, the size of the electrode body 50 that contributes to charging/discharging can be made larger, and the occupancy rate of the electrode body 50 in the battery case 40 can be increased. Therefore, it is possible to improve the volumetric energy density. In addition, in the above manufacturing method, the battery case 40 is constructed and the electrode body 50 is accommodated in the battery case 40 at the same time. Therefore, as compared with the conventional method, the yield of the battery case 40 itself can be improved and the manufacturing cost can be reduced.

As shown in FIG. 1, the angular battery 100 of the present embodiment includes the battery case 40 and the electrode body 50. Here, the sealing plate 70 is further provided. The angular battery 100 is hermetically sealed. The battery case 40 is configured of the first member 10, the second member 20, and the third member 30 described above. The battery case 40 has the rectangular bottom surface 12, the pair of long side surfaces 14 facing each other, and the pair of short side surfaces 16 facing each other and narrower than the long side surface 14. The bottom surface 12 and the pair of long side surfaces 14 are configured of the first member 10 described above. The long side surface 14 is a side surface having as one side thereof a long side of the rectangular bottom surface 12. The long side surface 14 is bent and extends from the bottom surface 12. No welded joint is formed at the boundary between the bottom surface 12 and the long side surface 14. The pair of short side surfaces 16 are configured of the second and third members 20 and 30 described above. The short side surface 16 is a side surface having as one side thereof a short side of the rectangular bottom surface 12. The short side surface 16 is welded to the bottom surface 12 and the long side surfaces 14. A welded joint is formed at the boundary between the bottom surface 12 and the short side surface 16 and the boundaries between the long side surfaces 14 and the short side surface 16.

The electrode body 50 is accommodated inside the battery case 40. The electrode body 50 has a pair of wide surfaces 52. The electrode body 50 is accommodated in the battery case 40 so that the wide surfaces 52 (see FIG. 2) face the pair of long side surfaces 14 of the battery case 40. The electrode body 50 is covered with the insulating film 54. The wide surfaces 52 of the electrode body 50 are sandwiched together with the insulating film 54 by the pair of long side surfaces 14 of the battery case 40 with the sandwiching force as described above. In a completely discharged state (a state in which the SOC (state of charge) is 0%), the sandwiching force is applied to the wide surfaces 52 of the electrode body 50 by the pair of long side surfaces 14.

The sealing plate 70 airtightly seals the opening of the battery case 40. Attached to the sealing plate 70 are a positive electrode internal terminal 72 that is electrically connected to the positive electrode of the electrode body 50 inside the battery case 40, a positive electrode external terminal 74 that is electrically connected to the positive electrode internal terminal 72 and protrudes to the outside of the battery case 40, a negative electrode internal terminal 82 that is electrically connected to the negative electrode of the electrode body 50 inside the battery case 40, and a negative electrode external terminal 84 that is electrically connected to the negative electrode internal terminal 82 and protrudes to the outside of the battery case 40.

The angular battery 100 can be used for various purposes, but can be desirably used as a large-sized (large-capacity) battery having a particularly high energy density. Examples of suitable applications include a power source (power source for driving a vehicle) for a motor mounted on a vehicle such as an electric vehicle (EV), a hybrid vehicle (HV), and a plug-in hybrid vehicle (PHV).

Although the specific examples of the present disclosure have been described in detail above, the above-described embodiments are merely exemplary and do not limit the scope of the claims. The techniques described in the claims include various changes and modifications of the specific examples illustrated above.

For example, in the above embodiment, as shown in FIG. 2, the pair of long side surfaces 14 of the first member 10 extended so as to rise vertically from the bottom surface 12, and the angle formed by the bottom surface 12 and the long side surface 14 was 90°. Further, the second and third members 20 and 30 each had a rectangular shape, and the unit body 60 had a rectangular parallelepiped shape. Further, as shown in FIG. 1, the outer shape of the angular battery 100 was a rectangular parallelepiped shape. However, these features are not limiting.

Figure 3:
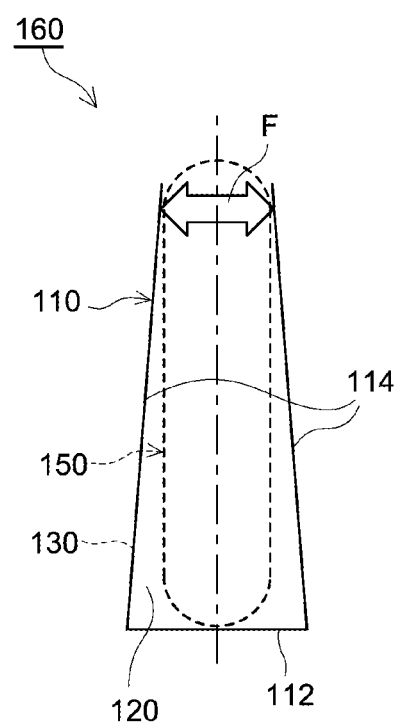
FIG. 3 is a schematic side view of a unit body according to another embodiment.

FIG. 3 is a schematic side view showing a unit body 160 for manufacturing an angular battery of a modification example. In the following, the description of the parts common to the above-described embodiment will be omitted, and the different parts will be described. The unit body 160 shown in FIG. 3 includes first to third members 110, 120, and 130, and an electrode body 150. FIG. 3 is a side view as viewed from the side of the second member 120. The electrode body 150 may be the same as the electrode body 50 described above. The first member 110 has a rectangular bottom surface 112 and a pair of long side surfaces 114 extending from the bottom surface 112 and facing each other. Here, the pair of long side surfaces 114 are provided to be inclined so that the distance therebetween becomes smaller as the distance from the bottom surface 112 increases. As a result, the bottom surface 112 and the long side surface 114 form an acute angle. As shown by an arrow in FIG. 3, a part of the upper side (that is, the side away from the bottom surface 112) of the electrode body 150 is sandwiched between a pair of long side surfaces 114 in a pinpoint manner. When the present inventors sandwiched load cells in the portions of the pair of long side surfaces 114 indicated by the arrows and measured the sandwiching force F applied to the electrode body 150, the result was 15 N. The second and third members 120 and 130 are each a trapezoidal flat plate member. Here, the unit body 160 has a trapezoidal outer shape. Although not shown, an angular battery having a trapezoidal outer shape can be manufactured by closing the opening of the unit body 160 with, for example, a substantially U-shaped sealing plate.

What is claimed is:

1. A method for manufacturing an angular battery including a battery case that has a rectangular bottom surface, a pair of rectangular long side surfaces having, as one side thereof, a long side of the rectangular bottom surface and facing each other, and a pair of short side surfaces having, as one side thereof, a short side of the rectangular bottom surface and facing each other; and an electrode body that is accommodated inside the battery case and has a pair of wide surfaces facing the rectangular long side surfaces, the manufacturing method including:

a preparation step of preparing a first member having substantially U-shaped end faces including the bottom surface and the pair of rectangular long side surfaces extending from the bottom surface, and a second member and a third member that are to be joined to respective end faces of the first member and constitute the short side surfaces, the members constituting the battery case;

a sandwiching step of sandwiching the wide surfaces of the electrode body between the pair of rectangular long side surfaces of the first member; and a joining step of joining the second and third members to the respective end faces of the first member in a state in which the electrode body is sandwiched by the pair of rectangular long side surfaces, wherein in the preparation step, the first member is prepared with the pair of rectangular long side surfaces inclined relative to each other along their entire respective lengths so that a distance between the rectangular long side surfaces becomes smaller as a distance from the bottom surface of the first member increases, and the second and third members constituting the short side surfaces are each prepared such that an entirety of each of the short side surfaces is shaped as a trapezoid, and the joining step results in the battery case for the angular battery having a finished, trapezoidal outer shape with the trapezoid-shaped short side surfaces fixing the pair of rectangular long side surfaces at an inclined angle relative to each other with a greater distance between the rectangular long side surfaces at the bottom surface of the first member than a distance between the rectangular long side surfaces at an opposite top side of the first member.

2. The method for manufacturing an angular battery according to claim 1, wherein in the sandwiching step, the pair of long side surfaces of the first member sandwich the wide surfaces of the electrode body with a sandwiching force of 15 N or more.

3. The method for manufacturing an angular battery according to claim 1, wherein at least portions of the wide surfaces of the electrode body that are to be sandwiched between the pair of long side surfaces are covered with an insulating film, and the electrode body is sandwiched together with the insulating film between the pair of long side surfaces of the first member in the sandwiching step.

4. The method for manufacturing an angular battery according to claim 1, wherein the first member having substantially U-shaped end faces is made of a metal.

\* \* \* \* \*